United States Patent Office 3,361,797
Patented Jan. 2, 1968

3,361,797
PROCESS FOR PRODUCING A DETERGENT
Herman S. Bloch, Skokie, Ill., assignor to Universal Oil Products Company, Des Plaines, Ill., a corporation of Delaware
No Drawing. Filed Oct. 28, 1964, Ser. No. 407,286
13 Claims. (Cl. 260—505)

This invention relates to a process for producing a biodegradable detergent. More specifically, this invention relates to a process for producing a detergent whose composition is:

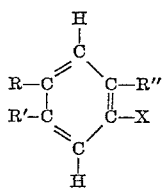

wherein R is an alkyl group having from 1 to about 17 carbon atoms, R' is selected from the group consisting of hydrogen and an alkyl group having from 1 to about 17 carbon atoms such that the sum of carbon atoms in R plus R' does not exceed 18, R" is selected from the group consisting of hydrogen and methyl and X is a hydrophilic group. Further, this invention relates to a process for the production of the above described detergent which comprises condensing a monoolefin having from about 9 to about 20 carbon atoms per molecule with a conjugated diene, dehydrogenating the resulting substituted cyclohexene, and introducing a hydrophilic group into the dehydrogenated product. The resulting product which contains both a hydrophobic and a hydrophilic group is a detergent material subject to bacterial attack and degradation in a subsequent sewage treatment process after the detergent has been used in a laundering or other cleaning operation and discharged into such sewage treatment facilities.

One of the major problems prevalent in centers of population throughout the world is the disposal of sewage and the inactivation of detergents dissolved in the sewage in even small quantities. Such disposal problem is especially vexatious in the case of those detergents having an alkylaryl structure as the nuclear portion of the detergent molecule. These detergents produce stable foams in hard or soft waters in such large quantities that the foam clogs sewage treatment facilities and often appears in sufficient concentration in such facilities to destroy the bacteria necessary for sufficient biological action for proper sewage treatment. One of the principal offenders of this type of detergent is the alkylaryl sulfonates, which, unlike the fatty acid soaps, do not precipitate when mixed with hard water containing calcium or magnesium ions in solution. Since these compounds are only partly biodegradable, the detergent persists in solution and is carried through the sewage treatment plant in substantially unchanged or still active form. Because of the abiding tendency of such detergents to foam, especially when mixed with aerating devices and stirrers, large quantities of foam are discharged from the sewage digestion plant into rivers and streams where the continuing presence of the detergent is marked by large billows of foam on the surface. Other offenders of this type of detergent are the polyoxyalkylated alkylphenols and the polyoxyalkylated alkylanilines. These same synthetic detergents also interfere with the anaerobic process of degradation of other materials such as grease, and thus compound further the pollution caused by sewage plant effluents containing such detergents. These dilute detergent solutions often enter subsurface water currents which feed into underground water strata from which cities draw their water supplies and these detergents find their way into the water supplies drawn from water taps in homes, factories, hospitals and schools. Occasionally these detergents turn up in sufficient quantities in tap water to make drinking water foam as it pours from the tap.

It is an object of this invention to produce a detergent capable of biological degradation during the treatment of sewage containing such detergents. It is another object of this invention to provide a process for making the biodegradable detergent.

It is a more specific object of this invention to produce a detergent of the composition:

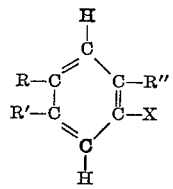

wherein R, R', R" and X are as described hereinbefore.

It is another more specific object of this invention to produce the biodegradable detergent by condensing a monoolefin with a conjugated diene, dehydrogenating the resulting cyclohexene and introducing a hydrophilic group into the condensed product.

One of the starting materials in the process of this invention is a monoolefin preferably of substantially normal character having about 9 to 20 carbon atoms per molecule. This material may be prepared by any well known method such as wax cracking or it may be prepared from substantially normal paraffins. In this latter source the normal paraffins are separated from hydrocarbon mixtures by molecular sieve extraction. The substantially normal paraffin may be reacted with a halogen selected from the group consisting of chlorine and bromine to form the alkyl halide. The alkyl halide is then dehydrohalogenated to form the substantially normal monoolefin.

Another of the starting materials in the process of this invention is a conjugated diene. This material is preferably selected from the group consisting of 1,3-butadiene and isoprene.

The heart of this invention lies in the reaction of the monoolefin with the conjugated diene. This reaction is carried out by thermally condensing the monoolefin with the conjugated diene at temperatures of from about 100° C. to about 250° C. and at pressures of atmospheric or moderately superatmospheric. The thermally condensed product, which is a substituted cyclohexene, is dehydrogenated over a suitable dehydrogenation catalyst at elevated temperature preferably within the range of from about 200° to about 500° C. and at moderately superatmospheric pressures, less than 500 p.s.i.g., to form an aromatic nucleus from the cyclohexene structure. A hydrophilic group may thereupon be introduced into the aromatic nucleus to form a water soluble, surface active detergent.

The reactions involved in this process are further illustrated by chemical symbols in which the starting materials are 4-nonene and 1,3-butadiene. The thermal condensation reaction is accomplished according to the following chemical reaction equation:

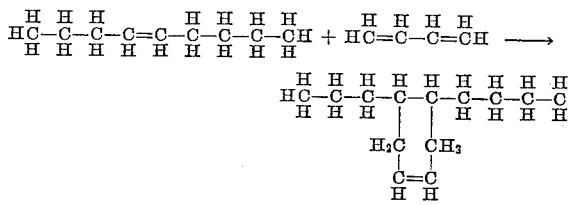

The substituted cyclohexene formed is 4-propyl-5-butylcyclohexene.

The dehydrogenation reaction is accomplished according to the following chemical reaction equation:

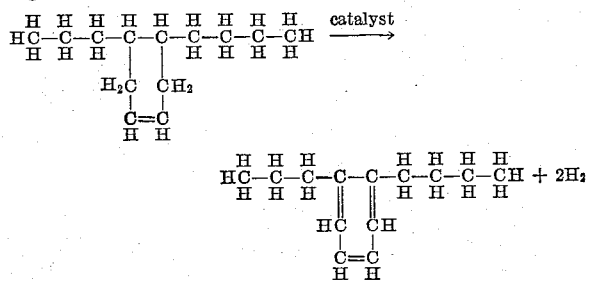

The resulting product called ortho-propyl-butylbenzene is more conventionally shown in chemical symbols as:

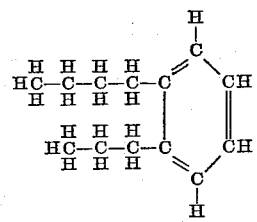

The dehydrogenated product may be rendered water soluble and surface active by the introduction of a hydrophilic group into the aromatic nucleus as for example by sulfonation. This is illustrated as follows:

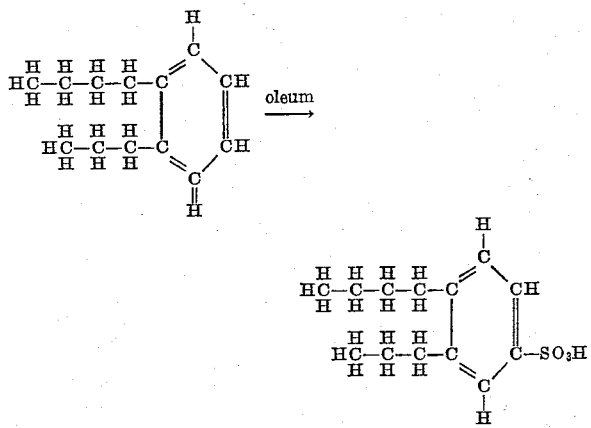

The monosulfonic acid may be neutralized as for example by reaction with a base to form the salt. This is illustrated as follows by reaction with sodium hydroxide:

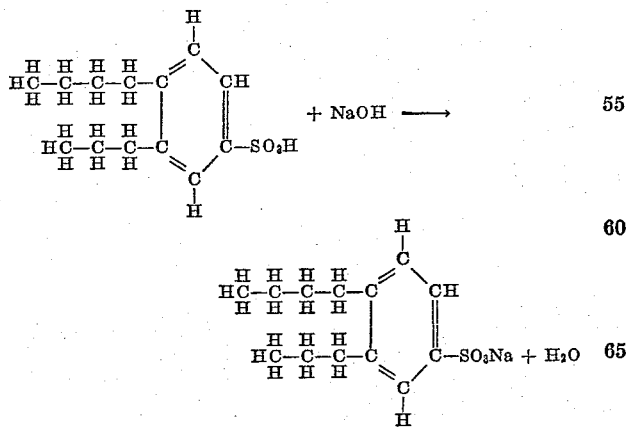

The dehydrogenation step is accomplished over any well known dehydrogenation catalyst. A preferable dehydrogenation catalyst comprises a Group VIII metal disposed on a high surface area non-acidic support such as charcoal, alkalized silica, alkalized alumina and kieselguhr. Especially preferably Group VIII metals include nickel, palladium and platinum. This step may be carried out by loading a fixed bed reactor with the above described catalyst and pressuring up the reactor with hydrogen up to operating pressure, preferably less than 500 p.s.i.g. The catalyst may be maintained at operating temperature either from heat supplied externally from outside heaters or alternatively the cyclohexene feed may be preheated. The feed is introduced into one end of the reactor along with a gas comprising hydrogen and the mixture passes over the fixed catalyst bed where the dehydrogenation reaction occurs. The effluent is withdrawn from the other end of the reactor and is cooled and introduced into a phase separation vessel. The vapor phase is removed from an upper part of said vessel where a portion of the hydrogen gas is recycled back to the reactor. Since the dehydrogenation reaction evolves two moles of hydrogen per mole of cyclohexene dehydrogenated, the other portion of the vapor phase is removed from the plant as a net off gas. If the purity of the hydrogen should decrease due to any undesirable cracking reactions, etc., additional make-up hydrogen would have to be supplied to the reactor to maintain a minimum purity of at least 50 mole percent. However, the purpose in employing a non-acidic support for the catalyst is to minimize any cracking reaction. The denser phase is removed from a lower part of said vessel as the desired aromatic hydrocarbon.

The resulting substituted aromatic hydrocarbon may be treated in a number of conventional ways to introduce a hydrophilic group into its structure thereby rendering it water soluble and surface active. Among the more common hydrophilic groups are the sulfonate and the polyoxyalkylene groups, both of which may be employed as effective hydrophilic groups to render a detergent water soluble and surface active. The latter group may be most conveniently made by reaction of an alkylene oxide such as ethylene oxide with the corresponding phenol, which in turn is made by dehydrogenating the cyclic alcohol formed by hydration of the aforementioned cyclohexene addition products. A preferable hydrophilic group especially suitable to be incorporated into said substituted aromatic hydrocarbon is the sulfonate griup. This group is readily introduced into the aromatic structure by contacting said aromatic hydrocarbon with oleum (fuming sulfuric acid) at temperatures less than 50° C. and preferably about 0° C. thereby forming the monosulfonic acid which is water soluble and surface active. If desired, the sulfonic acid may be neutralized with a basic material such as ammonia, a basic salt, etc. An especially preferable neutralizing agent is sodium hydroxide and potassium hydroxide yielding the sodium and potassium sulfonic acid salt respectively. This product is especially preferred, being water soluble, surface active and biodegradable when subsequently treated in conventional sewage treatment facilities. This and other well known methods and hydrophilic groups may be employed to form a water soluble, surface active and biodegradable detergents from said substituted aromatic hydrocarbon.

The resulting detergent has the following generic composition:

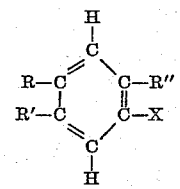

wherein R, R' and R" are as hereinbefore described and X is a hydrophilic group preferably selected from the group consisting of sulfonate, (X is —SO$_3$M where M is hydrogen, amine ion or an equivalent of a metal) and a hydroxypolyoxyalkylene (X is —O(C$_n$H$_{2n}$O)$_y$H where n is 2 or 3 and y is a number from 5 to 30). Said detergent is prepared from a monoolefin whose generic composition is R—CH=CHR' and a conjugated diene whose generic composition is

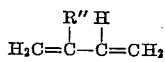

It is to be noted that when the cyclohexene is formed from butadiene and the monoolefin, R" is hydrogen whereas R" is a methyl group when isoprene is used as the conjugated diene. The relative number of carbon atoms in R and R' is determined by the position of the double bond in the monoolefin. Thus when the monoolefin is an alpha olefin, then R' will be hydrogen and R will contain all the carbon atoms in the original monoolefin except the two which become part of the cyclic structure.

The following examples are presented to illustrate the process of this invention but it is not intended to limit the scope of this invention to the feed materials or products of those specifically shown reactions in the examples.

*Example I*

A glass liner containing 189 grams (1.5 mole) of 4-nonene and 100 cc. hexane is sealed into an autoclave and about 27.0 grams of 1,3-butadiene is pressured in. The autoclave and contents are heated to a temperature of about 175° C., and maintained at this temperature for a period of about 8 hours at the end of which time the autoclave and contents thereof are cooled to room temperature and the desired 4-propyl-5-butyl cyclohexene is separated by ordinary batch fractionation. The substituted cyclohexene is contacted with a 1% platinum on alkalized alumina support catalyst at a temperature of 350° C. and a pressure of 100 p.s.i.g. The resulting aromatic hydrocarbon is introduced into a flask which is immersed in a bath maintained at 0° C. Oleum (30 percent) is introduced into said flask and the contents are thoroughly mixed. The resulting solids are separated from the liquid and thereupon contacted with sodium hydroxide until a pH of 7 is attained. The product is a crystalline cream colored solid which is completely soluble in water and forms aqueous solutions of excellent wetting properties.

*Example II*

A mixture of about 253 grams (1.5 moles) of 11-methyl-3-undecene and 100 cc. of hexane is introduced into a glass liner and sealed into an autoclave, whereupon about 34.1 grams of 2-methyl-1,3-butadiene (isoprene) is pressured in. The autoclave and contents are heated to about 175° C. and maintained at this temperature for a period of about 12 hours at the end of which time the desired 1-methyl-4-(2-methylheptyl)-5-ethylcyclohexene and its isomer are separated by ordinary batch fractionation. The substituted cyclohexene is thereafter dehydrogenated at the conditions described in Example I and rendered water soluble by contact with 30% oleum also as described in Example I. The resulting solids are separated from the liquid and thereupon neutralized with sodium hydroxide as described in Example I, forming a water-soluble solid of good detergent properties.

*Example III*

A glass liner containing about 420 grams (1.5 moles) of 5-eicosene and 200 cc. of hexane is sealed into an autoclave and about 27.0 grams of 1,3-butadiene is pressured in. The autoclave and contents are heated to a temperature of about 150° C. and maintained at this temperature for a period of about 16 hours at the end of which time the autoclave and the contents thereof are cooled to room temperature and the desired 4-tetradecyl-5-butylcyclohexene is separated by ordinary batch fractionation. The substituted cyclohexene is dehydrogenated, sulfonated and neutralized as described in Example I. The product is somewhat less water-soluble than that of Example II, but has better detergent properties.

I claim as my invention:

1. A process for the production of detergents which comprises the steps:
thermally condensing a substantially normal monoolefin having from about 9 to about 20 carbon atoms per molecule with butadiene or isoprene,
catalytically dehydrogenating the resulting substituted cyclohexene,
and introducing a hydrophilic group selected from sulfonate and hydroxypolyoxyalkylene into the dehydrogenated product.

2. The process of claim 1 further characterized in that the dehydrogenated product is reacted with oleum to form a monosulfonic acid product, thereby rendering said product water soluble and surface active.

3. The process of claim 2 further characterized in that the monosulfonic acid product is neutralized with a base whose cations are selected from the group consisting of ammonium, sodium and potassium.

4. The process of claim 1 further characterized in that said hydrophilic group is the sulfonate group.

5. A process for the production of detergents which comprises the steps:
thermally condensing a substantially normal monoolefin having from about 9 to about 20 carbon atoms per molecule with a conjugated diene selected from the group consisting of butadiene and isoprene,
dehydrogenating the resulting substituted cyclohexene over a dehydrogenation catalyst at elevated temperatures thereby converting the cyclic cyclohexene structure into an aromatic benzene structure,
and reacting the resulting substituted aromatic hydrocarbon with oleum to form monosulfonic acid.

6. The process of claim 5 further characterized in that the catalyst is a Group VIII metal disposed on a high surface area non-acidic support selected from the group consisting of activated carbon, alkalized silica, alkalized alumina and kieselguhr.

7. The process of claim 5 further characterized in that the thermal condensation step is carried out at temperatures of from about 100° C. to about 250° C., the dehydrogenation step is carried out at temperatures of from about 200° C. to about 500° C., and said catalyst comprises a Group VIII metal.

8. The process of claim 5 further characterized in that the sulfonated product is neutralized with a base whose cations are selected from the group consisting of ammonium, sodium and potassium.

9. A process for the production of biodegradable detergents which comprises the steps:
thermally condensing a substantially normal monoolefin having from about 9 to about 20 carbon atoms per molecule with a conjugated diene selected from the group consisting of butadiene and isoprene at temperatures of from about 100° C. to about 250° C.,
dehydrogenating the resulting substituted cyclohexene over a dehydrogenation catalyst comprising a Group VIII metal disposed on a high surface area non-acidic support selected from the group consisting of activated carbon, alkalized silica, alkalized alumina and kieselguhr at temperatures of from about 200° C. to about 500° C. thereby forming an aromatic substituted hydrocarbon,
reacting said aromatic hydrocarbon with oleum at temperatures below 50° C. to form a water soluble surface active monosulfonic acid,
and neutralizing said monosulfonic acid with a basic salt having a cation comprising sodium.

10. In a process for the production of detergents in which a hydrophobic group is built up followed by the introduction of a hydrophilic group selected from sulfonate and hydroxypolyoxyalkylene into the molecule to render it water soluble and surface active, the improvement which comprises forming the hydrophobic group by thermally condensing a substantially normal monoolefin with butadiene or isoprene to form a substituted cyclohexene and catalytically dehydrogenating said cyclohexene to the corresponding benzenoid compound.

11. A process for the production of a detergent which comprises thermally condensing a substantially normal moloolefin of from about 9 to about 20 carbon atoms per molecule with butadiene or isoprene at a temperature of from about 100° C. to about 250° C., catalytically dehydrogenating the resultant substituted cyclohexene at a temperature of from about 200° C. to about 500° C., and sulfonating the resultant dehydrogenated product to introduce the sulfonate group thereto.

12. The process of claim 11 further characterized in that said substituted cyclohexene is dehydrogenated in contact with a Group VIII metal catalyst.

13. The process of claim 12 further characterized in that said catalyst is a Group VIII metal disposed on a high surface area non-acidic support selected from the group consisting of activated carbon, alkalized silica, alkalized alumina and kieselguhr.

References Cited

UNITED STATES PATENTS

| | | | |
|---|---|---|---|
| 2,291,585 | 7/1942 | Bartlett et al. | 260—621 |
| 2,344,330 | 3/1944 | Sturgeon | 260—673 |
| 2,662,102 | 12/1953 | Whitman | 260—666 |
| 3,169,987 | 2/1965 | Bloch | 260—505 |

LORRAINE A. WEINBERGER, *Primary Examiner.*

M. WEBSTER, *Assistant Examiner.*